| United States Patent [19] | [11] | 4,255,476 |
|---|---|---|
| Joly et al. | [45] | Mar. 10, 1981 |

[54] PILE TEXTILE ELEMENTS

[75] Inventors: Jean Joly, Craponne; Joseph Puthon, Lyons, both of France

[73] Assignee: Rhone-Poulenc-Textile, Paris, France

[21] Appl. No.: 834,294

[22] Filed: Sep. 19, 1977

Related U.S. Application Data

[63] Continuation of Ser. No. 705,257, Jul. 14, 1976, abandoned.

[30] Foreign Application Priority Data

Jul. 24, 1975 [FR] France ............................. 75 23415
Jun. 3, 1976 [FR] France ............................. 76 17183
Jun. 10, 1976 [FR] France ............................. 76 17904

[51] Int. Cl.³ ............................................ D04H 11/00
[52] U.S. Cl. ........................................ 428/82; 156/72; 428/83; 428/92; 428/93; 428/95; 428/900

[58] Field of Search ....................... 428/82, 83, 92, 93, 428/95, 375, 376, 377, 310, 900; 156/72

[56] References Cited

FOREIGN PATENT DOCUMENTS 2531726 7/1975 Fed. Rep. of Germany ............. 428/95
579015 7/1946 United Kingdom .

*Primary Examiner*—Marion McCamish
*Attorney, Agent, or Firm*—Sherman & Shalloway

[57] ABSTRACT

Pile textile elements are disclosed in which textile filamentary materials are assembled in a bundle, these materials being held together at one end only, by any suitable means such as adhesive or crepe paper wrapped around the bundle. The other ends of the filamentary textile materials of the bundle are not connected. The pile elements can be fixed to a backing such as a textile backing, furniture, bedding etc., in a conventional manner.

10 Claims, 14 Drawing Figures

PILE TEXTILE ELEMENTS

This is a continuation of application Ser. No. 705,257, filed July 14, 1976 now abandoned.

The present invention relates to pile textile elements, of the tufted pile type, the process for their manufacture, as well as the articles produced therewith.

Pile textile articles are generally produced by weaving or knitting as well as by the process of manufacture which uses the needle-punched pile, or tufting, technique. Pile textile articles are used for garments or furnishings and are manufactured on a large scale, which results in a certain uniformity, for example of the covered surfaces, where pile articles intended for floor covering or wall covering are concerned.

The market for coverings corresponds to one of the needs of contemporary man, who seeks to improve the environment in which he lives by rendering it comfortable, by looking for good heat insulation and sound insulation, and by creating for himself an agreeable decor. However, because of the uniformity due to the manufacturing limitations mentioned above, it is not possible for contemporary man to compose for himself an environment in accordance with his wishes, which he can likewise modify, thus achieving a personal work which is in accordance with his tastes and the atmosphere which he desires, in the way that he can do, for example.

The present application is concerned with proposing a solution which allows the individual himself to produce his decor in accordance with his wishes.

According to the present invention, we provide a pile textile element comprising a pile textile element comprising a plurality of filamentary textile-animal, assembled in a bundle and means securing the materials of the bundle to one another at one end only of the bundle, the other end being free.

The filamentary textile material, which compose the element according to the invention can be of natural, or synthetic textiles, used separately or as a mixture. They can be of equal length or different lengths, crimped or flat, of the same cross-section or of differing cross-section, of the same gauge or of differing gauges, and coloured or non-coloured. For the production of the pile textile elements it is possible to use filamentary textile materials such as continuous filaments, spun fibre yarns, slivers or narrow tapes, employed individually or as mixtures. In the following specification the turn yarn will be used for all the above presentation of filamentary textile material. The yarns may or may not be coloured. These elements are generally of a solid, flat or cylindrical shape; it can be of interest, for the purpose of varying the effects and reducing the surface frizzing of the articles produced from the pile textile elements of solid shape, and furthermore for the purpose of facilitating the dyeing of the said elements, to provide pile textile elements which comprise at least one void.

The pile textile elements can be connected to a support or footpiece by the end which holds all the yarns secured to one another.

The present invention also relates to several processes of manufacture of the pile textile element mentioned above. A preferred process involves the steps of assembling the yarns in parallel to form a bundle, surrounding the bundle with an envelope and cutting the envelope at one of the ends which holds the yarns of the bundle in place.

The envelope can be flexible such as a film or an adhesive paper; preferably a crepe paper is used, which is held in place by a film of adhesive paper in the position of the join, or by rings or ties. It is also possible to hold the base of the textile element together by welding/cutting, the yarns being welded to one another during this operation. The envelope can be rigid, such as a plastic base which may be flat or may comprise a means of fixing the pile textile element. The envelope can be kept in place or be removed depending on its nature, on the article to be produced and on the wishes of the producer. The pile textile element can have a self-adhesive base.

According to another process, the pile textile element is produced by cutting a coil of yarn along at least one generatrix of the coil; the cut yarns are kept in place at the cut end by glue or by an adhesive surface or preferably, if the yarns lend themselves to this, by welding, using the welding/cutting process which makes it possible in a single operation, both to produce the cut and to produce the cohesion of the strands by welding, thus automatically forming the pile of the pile textile element. The pile textile element can be provided with a detachable base, which ensures both the stability of the yarns and the stability of the assembly, this detachable base being either flexible such as a small plane surface of textile or film, or rigid.

If pile textile elements comprising at least one void are concerned, the void can be central and/or peripheral or can form concentric circles.

For the manufacture of pile textile elements comprising voids, the procedure followed is as above, but with the introduction of a core during the manufacture of the elements, this core either being associated with the device and leaving its imprint, or forming part of the elements introduced into, and then shaped by, the device; the core will be removed subsequently, at the same time as the envelope, or at a different time. The core can be a flexible or rigid body.

In order that the invention will be better understood, the following description is given, merely by way of example, reference being made to the accompanying drawings, in which.

Figure 1:
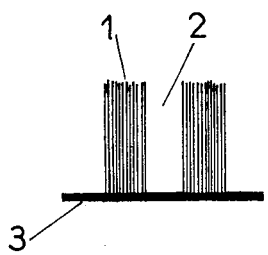
FIGS. 1 to 6 represent different embodiments of a pile textile element according to the invention.
Figure 2:
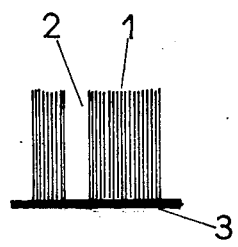
Figure 3:
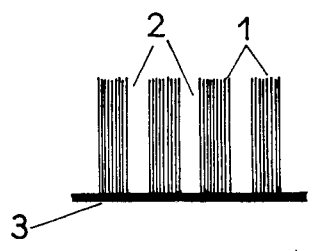

In FIG. 1, the pile textile element comprises a plurality of parallel yarns 1 assembled in a bundle having a central void 2, the yarns being secured to one another by a base 3. In FIG. 2, the void 2 is eccentric and in FIG. 3 there are two concentric voids 2, which may also be eccentric.

Figure 4:
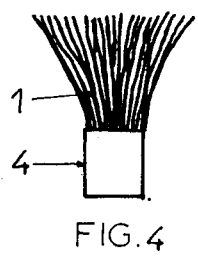

FIG. 4 shows an envelope 4 at the lower end of the element, the envelope holding the yarns 1 at that end, the yarns spreading out freely at the other end.

Figure 5:
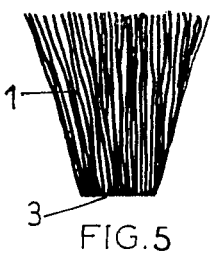

FIG. 5 represents a pile textile element without an envelope, the yarns being held together at the base 3 by welding or glueing.

Figure 6:
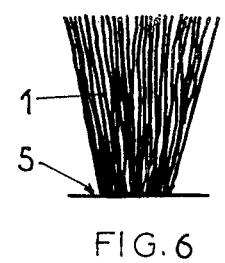

In FIG. 6 yarns are held together at the base 3 by welding or glueing with a detachable element 5.

Figure 7:
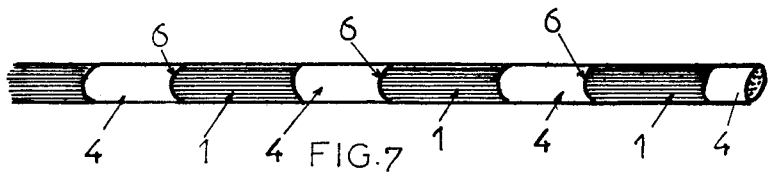
FIG. 7 represents one way of forming the pile textile element.

FIG. 7 shows yarns such as continuous filaments 1, held in certain places by rings or envelopes 4, a cut being made at the positions 6, so that the ends of the yarns formed by the cuts are held together by the envelope, while the other ends are free.

Figure 8:
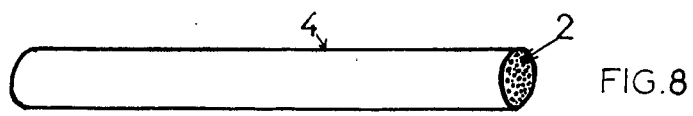
FIG. 8 represents another way of forming the pile textile elements.

FIG. 8 shows yarns held by an envelope 4, this enveloped cylindrical form subsequently being cut to the desired length.

As indicated, the present application also relates to the pile articles produced by means of at least one pile textile element.

The pile textile element can be used in furnishing, bedding, coachwork, garments, toys and, generally, for any decorative effect. As it can be of any shape and any colour, it makes it possible to produce fancy effects as desired.

It is possible to use self-adhesive elements which have a base coated with a glue covered with a release strip, this glue, based on elastomers, is used on a support which is itself coated with a solution, for example a flexible textile surface; this form of use makes it possible to produce very varied patterns on the actual place where it is desired to see them, whilst conventional decorative elements (carpets, tapestries and the like) are generally produced outside (that is to say not on site).

It is also possible to introduce a dyeing operation into the process of manufacture of the elements.

This process of dyeing, in line with manufacture, can be carried out either before, during or after the making-up of the pile textile elements, whether the elements be solid or include voids. If the dyeing operation is carried out before, the yarns can, for example, pass through an impregnation vat and then be subjected to fixing, rinsing and drying, the yarns either being kept in a hank or being spread out and kept parallel by means of, for example, a comb; other means of dyeing can be used, for exammple by transfer, by printing, by vapour-deposition, by deposition of a dyestuff and use of a doctor blade, or by a brief continuous exhaustion process.

If the dyeing operation is carried out in the device for the manufacture of the pile textile element, the dyestuff can be deposited in accordance with the processes, and by means of the dyeing device, described in U. S. Pat. Nos. 3,644,809; 3,751,778 and 3,955,254, of the Applicant Company. It is thus possible, if the pile textile element being formed has a void produced by a part of the device, to introduce the dye through the said part of the device, this dyeing then taking place from the interior of the pile textile element being formed.

If the dyeing operation is carried out after production of the pile textile element, it is possible to use, for example, the process which forms the subject of the above-mentioned patents, or the brief continuous exhaustion process, or to use one of the means employed for dyeing before manufacture of the element.

It is also possible to obtain special effects by combining the dyeing before and/or during and/or after the manufacture of the pile textile element. It is also possible to arrange to use, as the envelope, a special carrier coated with a dyestuff which is transferable by heat treatment.

It is equally possible to envisage carrying out the dyeing of the yarns after the latter have been cut or placed in position, so as to produce decorative effects; for example, if "do-it-yourself" articles, sold in a box, are concerned, these can contain, in addition to the yarns, means of dyeing in the form of capsules, or injectable by means of a syringe; the user can thus produce the patterns which he desires.

It is also possible to carry out the dyeing of the pile textile elements in line with the manufacture of the yarn, if a continuous textile is concerned, thus, the manufacture of the yarn, its texturising, if any, its dyeing and its continuous combination with other yarns to produce pile textile elements will be carried out continuously.

Figure 9:
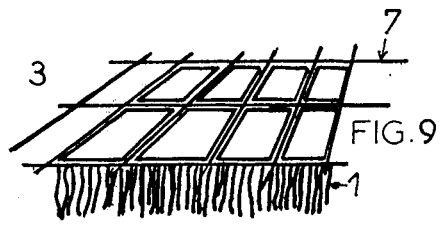
FIGS. 9 to 14 illustrate various possibilities of the use of pile textile elements according to the invention.

With the pile textile elements which form the subject of the present invention, it is possible to produce wall panels for decorative use, by mounting the pile textile, elements on a support, which is a gauze with square meshes; as indicated in FIG. 9, the pile elements are arranged upside-down and the base 3 is arranged on top, embedded in a fusible plastic associated with the gauze 7, by application of heat by means of, for exammple, a hot soldering iron. The surface thus obtained can be designed in the form of strips which can be cut off or torn off.

Figure 10:
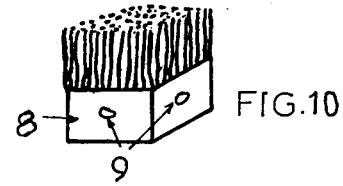

It is also possible to trap the base of the pile textile element in a means 8 formed with two channels 9 which pass, at right angles, through the means 8 or base (FIG. 10). It is thus possible to thread together several pile textile elements like beads, so as to produce the desired decorative object; the textile elements can have differently shaped bases, different colours, different sizes and the like.

Figure 11:
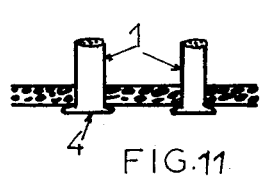
Figure 12:
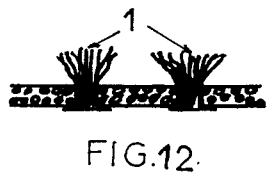

It is also possible to produce decorative effects by implanting pile textile elements, for example, in an armchair 10 made from a block of expanded plastic foam, in which orifices have optionally been produced for the insertion of the pile textile elements, this insertion taking place from either one side or the other of the sheet of expanded plastic, as illustrated respectively by FIGS. 11 and 12, the element being inserted (FIG. 11) through the reverse orifice; in that case, it is preferred to use the base element illustrated in FIG. 6, provided with an envelope which is thereafter withdrawn, so as to facilitate the spreading out of the pile (FIG. 12).

Figure 13:
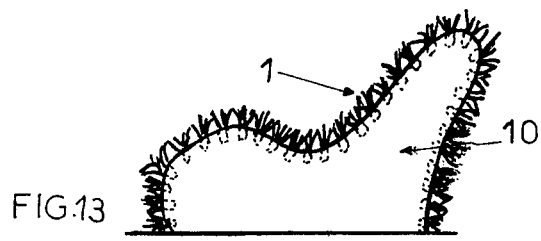
Figure 14:
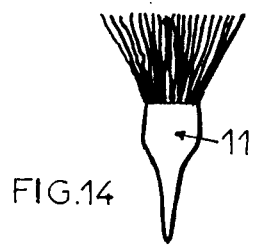

It is, of course, possible to implant the pile textile elements directly in the moulded block of foam, as illustrated by FIG. 13, either by producing orifices in which the elements are inserted or by implanting elements provided with a pointed base 11 provided for this purpose (FIG. 14).

Another example of the use of these pile textile elements is to fix them to the ceiling so as to give seaweed-type pile effects, the pile being in that case very long and of varying lengths; this fixing to the ceiling, as with the fixing for a decorative wall pattern, can be effected by any means, for example by magnetic means. To facilitate the connections, the bases of the pile textile elements are preferably of geometrical shape, but their surface is immaterial and depends on the desired effects. Delivered in this way, ready to use, or to be cut up at home, it is possible to achieve a personal work, using the pile textile elements. An additional advantage resides in the possibility of changing the designs when desired, or when they are worn.

The examples which follow illustrate the present invention without limiting it.

EXAMPLE 1

A bundle is formed from 50 yarns each consisting of a double yarn of twist 100 turns per meter in the Z-direction, of two yarns of 100 turns in the Z-direction, each of these two yarns being of 2,800 dtex/136 filaments and consisting of poly(hexamethylene adipamide).

With this bundle, pile textile elements such as shown in FIG. 1 are produced by the process illustrated in FIG. 4. The total length of the element is 5 centimeters and the length of the adhesive crepe paper envelope is 2 centimeters. The pile textile elements obtained are implanted in a car seat of expanded plastic foam on which the pattern which it is desired to reproduce has been printed. In order to implant the tufts, the foam is pricked with a needle in the previously marked areas, an opening-out tool is used to enlarge the orifice obtained and the elements, of which the base has beforehand been coated with a neoprene glue, are implanted.

A pile-covered seat is thus easily obtained.

EXAMPLE 2

A bundle of 80 yarns each consisting of a double yarn of twist 100 turns per meter in the Z-direction, of two yarns of 100 turns in the S-direction, each of these two yarns being of 2,800 dtex/136 filaments and consisting of poly(hexamethylene adipamide). This bundle is given a slight twist and is passed into a device in which it is enveloped by an adhesive crepe paper.

a long cylindrical mass of enveloped yarns, as shown in FIG. 8, is thus obtained, which is subsequently cut to the desired length, the envelope holding the strands compact over the entire length of the element until the latter is put into position. This is done after cutting, by coating one side of the element with a glue and positioning it on a textile surface; after drying, the envelope is pulled off. An advantage of this process is the 100% of the pile is at the surface because no implantation has been carried out.

A flexible decorative article is thus obtained.

EXAMPLE 3

40 ends of a twisted yarn obtained by twisting, at 80 turns per meter in the S-direction, two continuous yarns of polyhexamethylene adipamide of gauge 2,800 dtex/136 filaments, each yarn having a twist of 80 turns per meter in the Z-direction, are arranged about a core consisting of a 4 mm diameter rod of expanded polystyrene.

The pile textile element obtained, of 14 mm diameter, is surrounded by crepe paper held in place by an adhesive tape. The cigarette-type element obtained is cut into 50 mm lengths. The core of expanded polystyrene is subsequently destroyed, after glueing the pile textile elements onto a support, by treatment with a small amount of trichloroethylene vapour, which thus makes it possible to cause the said polystyrene to disappear, only leaving a few traces towards the base of the pile textile element, which is thus in the form of a hollow cylinder.

EXAMPLE 4

60 continuous yarns of polyhexamethylene adipamide of gauge 2,800 dtex/136 filaments are arranged parallel, to form a web, by means of a comb. This web-type presentation passes through an impregnating vat containing an aqueous solution of the following products:

Thickener: 3 to 4 g/liter of Solvitose GUM OFA, a non-toxic product obtained from galactomannane (Messrs. DIAMOND SHAMROCK France, formerly DOITTEAU).

Dyestuff: 5 g/liter pf Nylozane Yellow E-GL (Messrs. SANDOZ = C.I. Acid Yellow 29/1).

Wetting agent: 4 g/liter of Hostapal CV, a Non-ionic product obtained by reacting an alkylphenol with ethylene oxide (Messrs. HOECHST).

Foaming agent: 3 g/liter of Doitteau 27C, which is a modified fatty alcohol-sulphate.

Acetic acid is added in sufficient amount to bring the pH of the bath to between 3 and 4. The bath temperature is ambient temperature. The yarns pass, as a web, through the vat and then through a padder; the dyeing is thereafter fixed by steaming at 100°C; the yarns again pass into a vat for rinsing, drying being carried out subsequently at a temperature of 180°C.

The dry, coloured yarns are finally turned back into hanks and are converted to pile textile elements as described above, namely by applying a crepe paper envelope, holding the whole by means of an adhesive tape and then cutting it into 50 mm lengths.

EXAMPLE 5

A pile textile element of 12 mm diameter is produced from a bundle of 40 continuous yarns of polyhexamethylene adipamide, of gauge 2,800 dtex/136 filaments, using a perforated envelope.

The envelope obtained then passes into an impregnation tank containing the same constituents as in Example 1, except for the dyestuff used, which in this case is Trichrome Yellow JRLL (Pechiney-Ugine-Kuhlmann-C.I. Acid Yellow 121). It is then subjected to the same fixing, rinsing and drying operations, after which it is cut into 40 mm long elements.

We claim:

1. A pile textile element for decorative pile articles comprising a plurality of filamentary textile materials assembled in a bundle, said filamentary textile materials of the bundle being welded to one another at one end only of the bundle, the other end being free and a removable envelope encasing the bundle along its entire length, said welded end and envelope securing and stabilizing said filamentary textile materials in said bundle and facilitating handling of said element and a base attached to said welded end of said bundle, said base including magnetic elements for magnetically affixing said base to a support.

2. A pile textile element as claimed in claim 1, wherein the bundle comprises at least one void.

3. A pile textile element as claimed in claim 2, wherein the bundle is in the form of a hollow cylinder.

4. A pile textile element as claimed in claim 1, wherein said envelope is flexible.

5. A pile textile element as claimed in claim 1, wherein said envelope is rigid.

6. A pile textile element as claimed in claim 1, wherein said base is flexible.

7. A pile textile element as claimed in claim 1, wherein said base is rigid.

8. A pile textile element as claimed in claim 1, wherein said base is heat-sealed to said welded end.

9. A pile textile element for decorative pile articles comprising a plurality of filamentary textile materials assembled in a bundle, said filamentary textile materials of the bundle being welded to one another at one end only of the bundle, the other end being free, and a removable envelope encasing the bundle along its entire length, said welded end and envelope securing and stabilizing said filamentary textile materials in said bundle and facilitating handling of said element in a base attached to said welded end of said bundle, said base including a plurality of channels for receiving a thread.

10. In a process for forming a decorative pile article by securing a plurality of pile textile elements to a gauze material having a heat-fusible plastic material associated therewith, the improvement comprising using as said pile textile element a bundle of filamentary textile materials which are welded to one another at one end thereof, and a removable envelope encasing the bundle at least at the welded end and implanting the welded end of each of the pile textile elements to one surface of the gauze material, said elements being heat secured to said gauze material by heating said heat-fusible plastic while in contact with the welded end of said pile textile element, whereby the entire pile textile element extends from said surface wherein the removable envelope encases the entire length of each element and which further comprises removing said removable envelope from each element after said element has been implanted in said surface.

* * * * *

UNITED STATES PATENT AND TRADEMARK OFFICE
CERTIFICATE OF CORRECTION

PATENT NO. : 4,255,476
DATED : March 10, 1981
INVENTOR(S) : Jean Joly and Joseph Puthon It is certified that error appears in the above—identified patent and that said Letters Patent is hereby corrected as shown below:

Please amend Page 1, item [30] to read as follows:

Jul. 24, 1975 [FR] France............75 23415
    Jun. 3, 1976 [FR] France............76 17904
    Jun. 10, 1976 [FR] France............76 17183

Signed and Sealed this

Nineteenth Day of May 1981

[SEAL]

Attest:

RENE D. TEGTMEYER

Attesting Officer     Acting Commissioner of Patents and Trademarks

UNITED STATES PATENT AND TRADEMARK OFFICE
CERTIFICATE OF CORRECTION

PATENT NO. : 4,255,476
DATED : March 10, 1981
INVENTOR(S) : Jean Joly and Joseph Puthon It is certified that error appears in the above—identified patent and that said Letters Patent is hereby corrected as shown below:

Please amend Page 1, item [30] to read as follows:

```
Jul. 24, 1975  [FR] France ...........75 23415
Jun.  3, 1976  [FR] France ...........76 17183
Jun. 10, 1976  [FR] France ...........76 17904
```

This certificate supersedes Certificate of Correction issued May 19, 1981.

Signed and Sealed this

Twenty-ninth Day of September 1981

[SEAL]

Attest:

Attesting Officer

GERALD J. MOSSINGHOFF

Commissioner of Patents and Trademarks